UNITED STATES PATENT OFFICE.

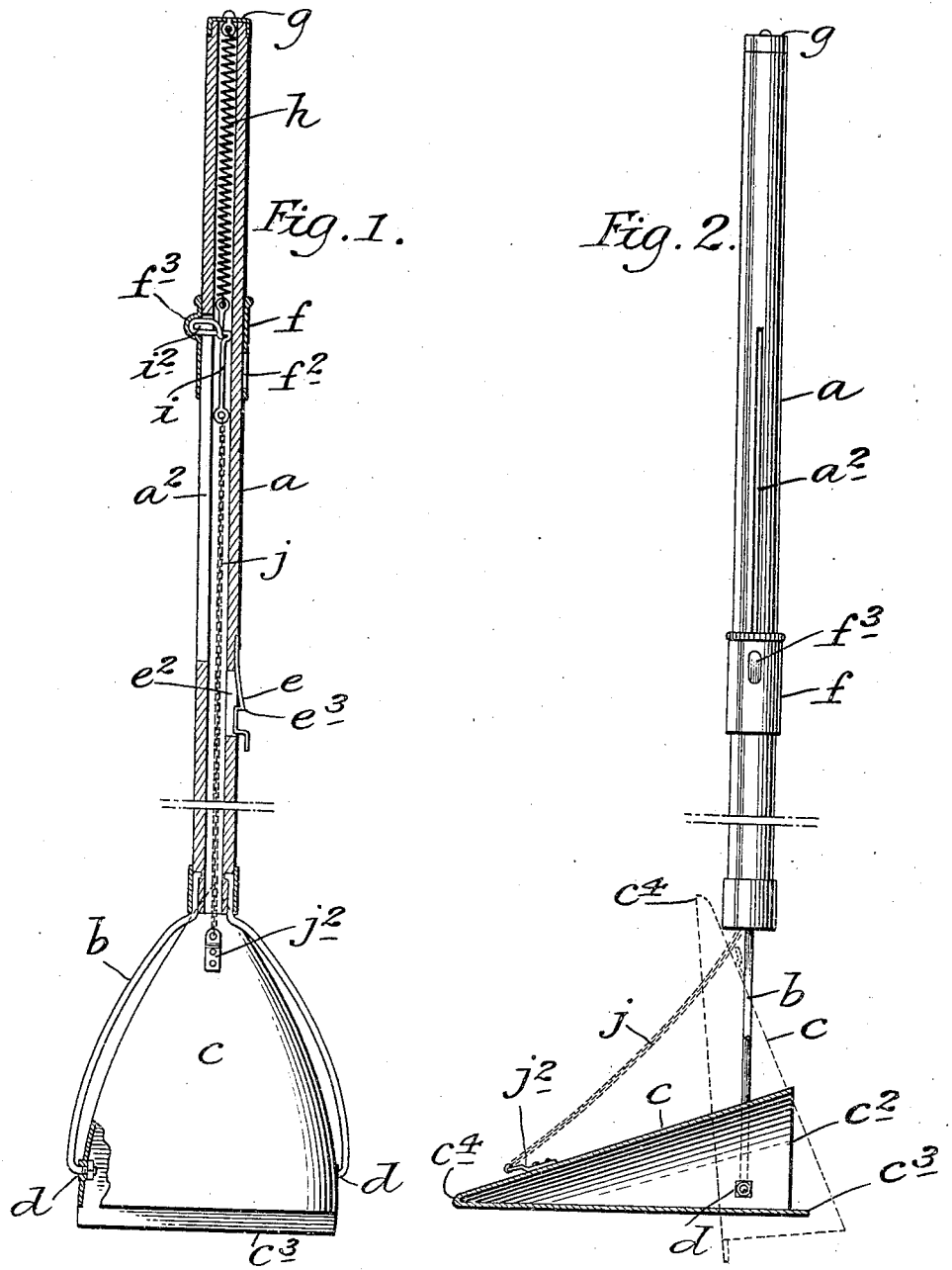

MAX FELD AND DAVID FROEHLICH, OF NEW YORK, N. Y.

DUST-PAN.

959,926. Specification of Letters Patent. Patented May 31, 1910.

Application filed March 8, 1910. Serial No. 547,966.

*To all whom it may concern:*

Be it known that we, MAX FELD and DAVID FROEHLICH, citizens of Austria-Hungary, and residing at New York, in the county of New York and State of New York, have invented certain new and useful Improvements in Dust-Pans, of which the following is a specification, such as will enable those skilled in the art to which it appertains to make and use the same.

This invention relates to dust pans, and the object thereof is to provide an improved device of this class which may be conveniently manipulated, and which comprises a tubular handle portion having a yoke-shaped support at one end between which the pin is pivoted and adapted to swing in a plane of the handle portion, said handle portion and pan being also provided with means whereby the pan may be locked in a position approximately in line with the handle portion, and whereby said pan may swing into a position at an angle to said handle portion.

The invention is fully disclosed in the following specification, of which the accompanying drawing forms a part, in which the separate parts of our improvement are designated by suitable reference characters in each of the views, and in which—

Figure 1 is a back view of our improved dust pan, the handle portion being in section and the pan being in an inoperative position, and; Fig. 2 a view at right angles to Fig. 1 but showing the pan in operative position and in section.

In the practice of our invention we provide a device of the class specified, comprising a tubular handle $a$ provided at one end with a fork-shaped support $b$, between the side arms of which the pan $c$ is pivoted as shown at $d$. The pan $c$, in the form of construction shown, is substantially triangular in form, the wider and larger end portion thereof being pivoted between the arms of the fork-shaped support $b$, and being open as shown at $c^2$, and the bottom thereof is provided with a projecting flange or blade member $c^3$ in the usual manner, and when the pan $c$ is in the position shown in full lines in Fig. 1 and dotted lines in Fig. 2, the smaller or pointed end $c^4$ thereof which is closed strikes against the corresponding end of the handle $a$. The handle $a$ is provided in one side thereof with a longitudinal slot $a^2$, and in the opposite side and between the slot $a^2$ and the fork-shaped support $b$, in the form of construction shown, with a spring catch $e$ which operates in a slot $e^2$ in the handle and said catch is similar to those employed in connection with the handles of umbrellas. Mounted on the handle $a$ is a runner sleeve $f$ having a slot $f^2$ adapted to engage the spring catch $e$ or through which the point or projection $e^3$ of said spring catch is adapted to pass, and said runner sleeve $f$ is provided in one side and adjacent to one end with a recess $f^3$ which opens inwardly.

In the end of the handle $a$, opposite the pan $c$, is secured as shown at $g$, a spiral spring $h$ to which is secured a wire or rod $i$ having a projecting loop member $i^2$ which passes through the slot $a^2$ and into the recess $f^2$ in the runner sleeve $f$, and connected with the wire or rod $i$ is a chain $j$ or other flexible device, which is connected with the pan $c$ at $j^2$. The normal position of the pan $c$ when not in use is shown in Fig. 2, in dotted lines, and in this position the runner sleeve $f$ is in the position shown in Fig. 1. When it is desired to use the pan the runner sleeve $f$ is moved down the handle $a$ into the position shown in Fig. 2, and in this operation the spring $h$ is extended, and the sleeve $f$ engages the spring catch $e^2$ and is held in the position shown in Fig. 2. In this position of the parts the pan $c$ assumes the position shown in full lines in Fig. 2, and the device may be used while the operator stands in an upright position, the dirt being swept into the open end of the pan. When this operation is completed the device may be carried to any desired point and the contents of the pan may be dropped out, or into any suitable receptacle, by moving the sleeve $f$ back into the position shown in Fig. 1.

Our invention is not limited to the form of the dust pan $c$ as herein shown and described, all that is necessary being that the open end portion of the pan be pivoted in the yoke-shaped support, and changes in and modifications of the construction herein described may be made within the scope of the appended claim without departing from the spirit of our invention or sacrificing its advantages.

Having fully described our invention, what we claim as new, and desire to secure by Letters Patent, is:—

A dust pan device, comprising a tubular handle provided at one end with a fork-shaped support, a dust pan, one end of which is open and the other closed, the open end portion of said pan being pivoted in said support, a runner sleeve mounted on said handle, a spiral spring secured in the end portion of the handle opposite said support and connected with said sleeve, a flexible device connected with the closed end of the pan and passed into the handle and connected with said spring and means for holding the runner sleeve in a predetermined position on said handle.

In testimony that we claim the foregoing as our invention we have signed our names in presence of the subscribing witnesses this 5th day of March, 1910.

MAX FELD.
DAVID FROEHLICH.

Witnesses:
B. M. RYERSON,
C. E. MULREANY.